(12) United States Patent
Bax

(10) Patent No.: US 10,198,743 B2
(45) Date of Patent: Feb. 5, 2019

(54) DETECTING PROHIBITED DATA USE IN AUCTION-BASED ONLINE ADVERTISING

(71) Applicant: Yahoo! Inc., Sunnyvale, CA (US)

(72) Inventor: Eric Theodore Bax, Altadena, CA (US)

(73) Assignee: Excalibur IP, LLC, New York, NY (US)

( * ) Notice: Subject to any disclaimer, the term of this patent is extended or adjusted under 35 U.S.C. 154(b) by 741 days.

(21) Appl. No.: 13/859,408

(22) Filed: Apr. 9, 2013

(65) Prior Publication Data

US 2014/0304067 A1 Oct. 9, 2014

(51) Int. Cl.
| | | |
|---|---|---|
| G06Q 30/00 | (2012.01) | |
| G06Q 30/02 | (2012.01) | |
| G06Q 30/08 | (2012.01) | |
| G05B 19/418 | (2006.01) | |

(52) U.S. Cl.
CPC ..... *G06Q 30/0248* (2013.01); *G06Q 30/0251* (2013.01); *G06Q 30/0275* (2013.01); *G06Q 30/08* (2013.01)

(58) Field of Classification Search
None
See application file for complete search history.

(56) References Cited

U.S. PATENT DOCUMENTS

| | | | | |
|---|---|---|---|---|
| 8,650,084 B2* | 2/2014 | Athey | .......... | G06Q 30/02 705/14.46 |
| 2006/0276995 A1* | 12/2006 | Breitgand | .......... | H04L 41/00 702/179 |
| 2009/0171728 A1* | 7/2009 | Yan | .......... | G06F 17/30864 705/14.48 |
| 2010/0293221 A1* | 11/2010 | Sidman | .......... | G06F 17/30855 709/203 |
| 2011/0016015 A1* | 1/2011 | Bolivar | .......... | G06Q 30/0601 705/26.3 |

(Continued)

OTHER PUBLICATIONS

"Data Mining Methods for Detection of New Malicious Executables", Schultz, Eskin, Zadok and Stolfo. Publication Date: Jan. 1, 2001. Dept. of Comput. Sci., Columbia Univ., New York, NY, USA. ISBN: 0-7695-1046-9 (Year : 2001).*

(Continued)

*Primary Examiner* — Maria V Vanderhorst
(74) *Attorney, Agent, or Firm* — Mauriel Kapouytian Woods LLP; Serge Krimnus; James Woods

(57) ABSTRACT

Techniques are provided that relate to online advertising, such as in connection with an auction-based online advertising market, including techniques for determining evidence of prohibited use of user segment information by an advertiser. Segment information may be utilized in allowing a targeted advertising opportunity for an advertiser. The advertiser may, for example, have agreed not to use such segment information outside of the allowed opportunity. Particular users in a segment may be identified and utilized as indicator users for use in determining evidence of prohibited use of segment information by an advertiser in bidding occurring after the targeted advertising opportunity. For example, later advertiser bidding relating to near-threshold in-segment or out-of-segment indicator users may be analyzed. Alternatively or additionally, for example, bidding relating to false positive or false negative indicator users may be analyzed, where such indicator users may be falsely identified by an advertiser as being in-segment or out-of-segment.

18 Claims, 7 Drawing Sheets

(56) References Cited

U.S. PATENT DOCUMENTS

| | | | |
|---|---|---|---|
| 2011/0238490 A1* | 9/2011 | Simard | G06Q 30/02 705/14.43 |
| 2011/0246298 A1* | 10/2011 | Williams | G06Q 30/02 705/14.53 |
| 2013/0218825 A1* | 8/2013 | Zhang | G06Q 10/04 706/52 |
| 2013/0262226 A1* | 10/2013 | LaChapelle | G06Q 30/0269 705/14.53 |
| 2013/0262368 A1* | 10/2013 | Wolff | G06F 17/18 706/52 |
| 2014/0279794 A1* | 9/2014 | Aliferis | G06F 3/0481 706/46 |

OTHER PUBLICATIONS

"Shared Winner Determination in Sponsored Search Auctions". Martin, D.J. and Halpern, J.Y. ISBN (paper): 978-1-4244-3422-0; publication date: Mar. 1, 2009. (Year: 2009).*

* cited by examiner

DETECTING PROHIBITED DATA USE IN AUCTION-BASED ONLINE ADVERTISING

BACKGROUND

In contexts such as auction-based online advertising markets, entities such as, for example, publishers, market facilitators, or others may collect or obtain information on users, such as, for example, demographic information, browsing history information which may suggests user interests or other user characteristics, information shared by users relating to user interests, and other information. Such entities (which can include their proxies, agents, associates, etc.) may, for example, use such information in grouping users into groups or segments, which may, for example, be useful for advertisers in targeting users with online advertisements. Such entities may, for example, charge advertisers more to target users in certain segments.

Purchasing advertisers may, for example, agree, however, not to use (such as re-use), such segment information (which can broadly include various types of information about or relating to the segment or users in the segment), such as other than for the purchased advertising. Nonetheless, advertisers sometimes do, in fact, make prohibited use of such segment information. This prohibited use can be very costly or damaging to such entities.

SUMMARY

Some embodiments of the invention provide systems and methods that relate to online advertising, such as in connection with an auction-based online advertising market, including techniques for determining evidence of prohibited use of user segment information by an advertiser. Segment information may be utilized in allowing a targeted advertising opportunity for an advertiser. The advertiser may, for example, have agreed not to use such segment information outside of the allowed opportunity. Particular users in a segment may be identified and utilized as indicator users for use in determining evidence of prohibited use of segment information by an advertiser in bidding occurring after the targeted advertising opportunity.

For example, in some embodiments, later advertiser bidding relating to near-threshold in-segment or out-of-segment indicator users may be analyzed. Advertiser bidding, such as may include advertiser bid amounts, that varies sufficiently (such as beyond a determined threshold level) from predicted advertising bidding not including prohibited use of segment information may be analyzed to determine evidence of prohibited use of segment information.

Alternatively or additionally, in some embodiments, bidding relating to false positive or false negative indicator users may be analyzed, where such indicator users may be falsely identified by an advertiser as being in-segment or out-of-segment. Advertising bidding in connection with such indicator users may be analyzed to determine evidence of prohibited use of segment information. For example, advertiser bidding relating to a false positive user that appears to reflect a belief that the user is actually in the segment, or advertiser bidding relating to a false negative user that appears to reflect a belief that the user is not in the segment, may lead to a determination of prohibited use.

Furthermore, in some embodiments, false positive and false negative indicator users may be selected from near-threshold users, which may, among other things, make detection of such users difficult for advertisers.

While the invention is described with reference to the above drawings, the drawings are intended to be illustrative, and the invention contemplates other embodiments within the spirit of the invention.

DETAILED DESCRIPTION

Figure 1:
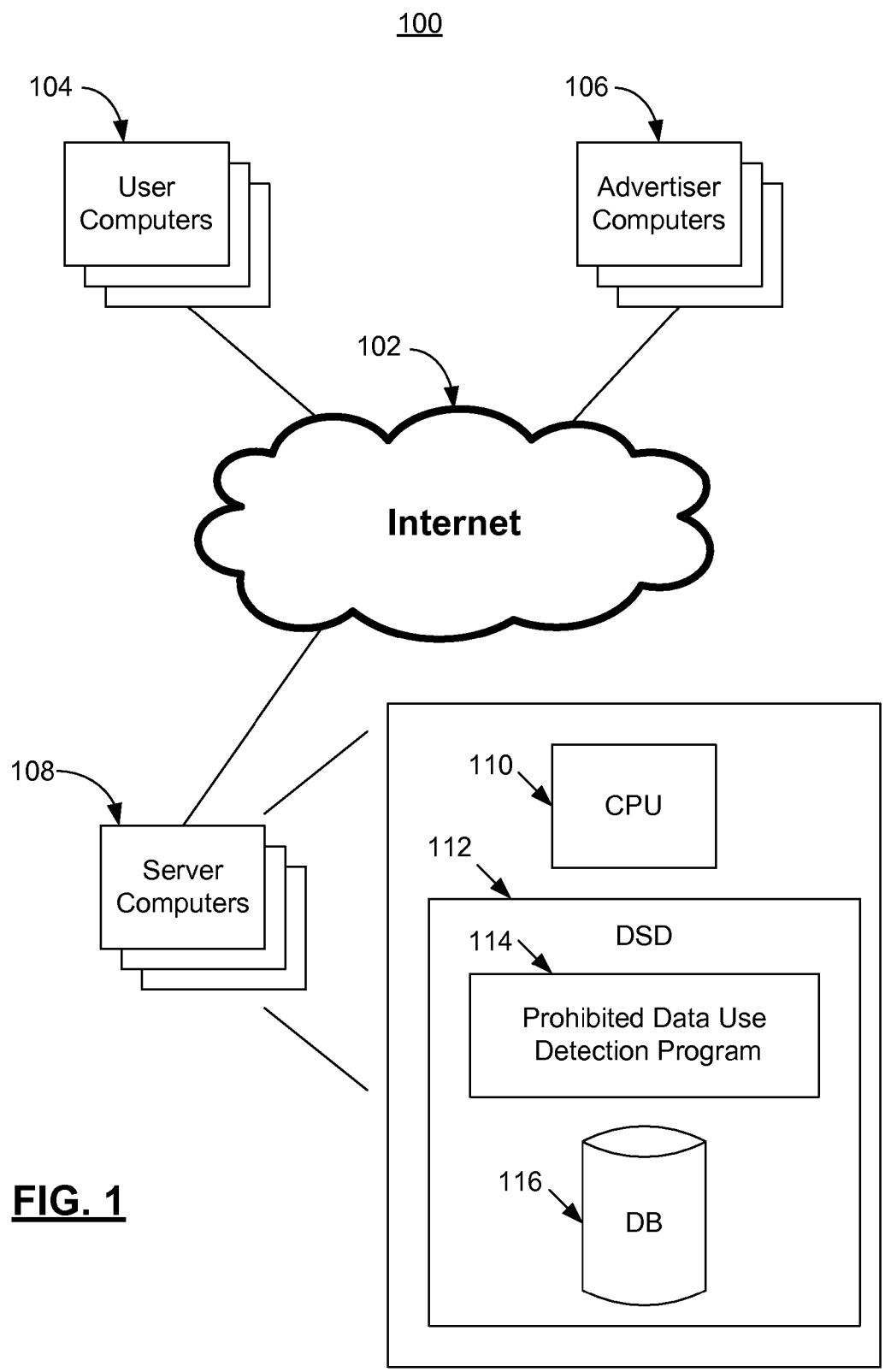
FIG. 1 is a distributed computer system according to one embodiment of the invention.

FIG. 1 is a distributed computer system 100 according to one embodiment of the invention. The system 100 includes user computers 104, advertiser computers 106 and server computers 108, all coupled or able to be coupled to the Internet 102. Although the Internet 102 is depicted, the invention contemplates other embodiments in which the Internet is not included, as well as embodiments in which other networks are included in addition to the Internet, including one more wireless networks, WANs, LANs, telephone, cell phone, or other data networks, etc. The invention further contemplates embodiments in which user computers or other computers may be or include wireless, portable, or handheld devices such as cell phones, smart phone, PDAs, tablets, etc.

Each of the one or more computers 104, 106, 108 may be distributed, and can include various hardware, software, applications, algorithms, programs and tools. Depicted computers may also include a hard drive, monitor, keyboard, pointing or selecting device, etc. The computers may operate using an operating system such as Windows by Microsoft, etc. Each computer may include a central processing unit (CPU), data storage device, and various amounts of memory including RAM and ROM. Depicted computers may also include various programming, applications, algorithms and software to enable searching, search results, and advertising, such as graphical or banner advertising as well as keyword searching and advertising in a sponsored search context. Many types of advertisements are contemplated, including textual advertisements, rich advertisements, video advertisements, coupon-related advertisements, group-related advertisements, social networking-related advertisements, etc.

The depicted server computers 108 are intended to represent server computers of any of various non-advertiser entities, which can include, for example, publishers, market facilitators or market-makers, content providers, data providers, and others. As depicted, each of the server computers 108 includes one or more CPUs 110 and a data storage device 112. The data storage device 112 includes a database 116 and Prohibited Data Use Detection Program 114.

The Program 114 is intended to broadly include all programming, applications, algorithms, software, engines, modules, functions, and other tools necessary to implement or facilitate methods and systems according to embodiments of the invention, whether, for example, by one entity, several entities, several types of entities, etc. The elements of the Program 114 may exist on a single server computer or be distributed among multiple computers or devices.

Figure 2:
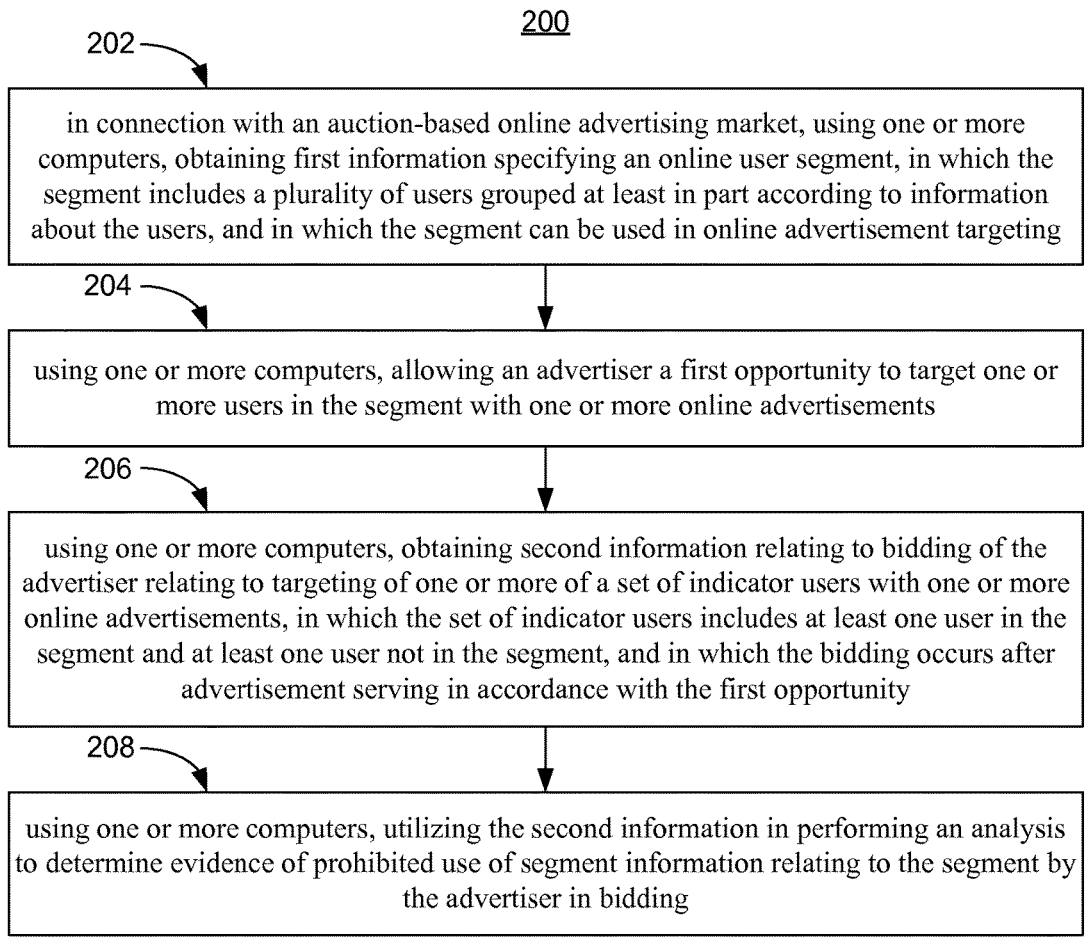
FIG. 2 is a flow diagram illustrating a method according to one embodiment of the invention.

FIG. 2 is a flow diagram illustrating a method 200 according to one embodiment of the invention.

Step 202 includes, in connection with an auction-based online advertising market, using one or more computers, obtaining first information specifying an online user segment, in which the segment includes a plurality of users grouped at least in part according to information about the users, and in which the segment can be used in online advertisement targeting.

Step 204 includes, using one or more computers, allowing an advertiser a first opportunity to target one or more users in the segment with one or more online advertisements.

Step 206 includes, using one or more computers, obtaining second information relating to bidding of the advertiser relating to targeting of one or more of a set of indicator users with one or more online advertisements, in which the set of indicator users includes at least one user in the segment and at least one user not in the segment, and in which the bidding occurs after advertisement serving in accordance with the first opportunity.

Step 208 includes, using one or more computers, utilizing the second information in performing an analysis to determine evidence of prohibited use of segment information relating to the segment by the advertiser in bidding.

Figure 3:
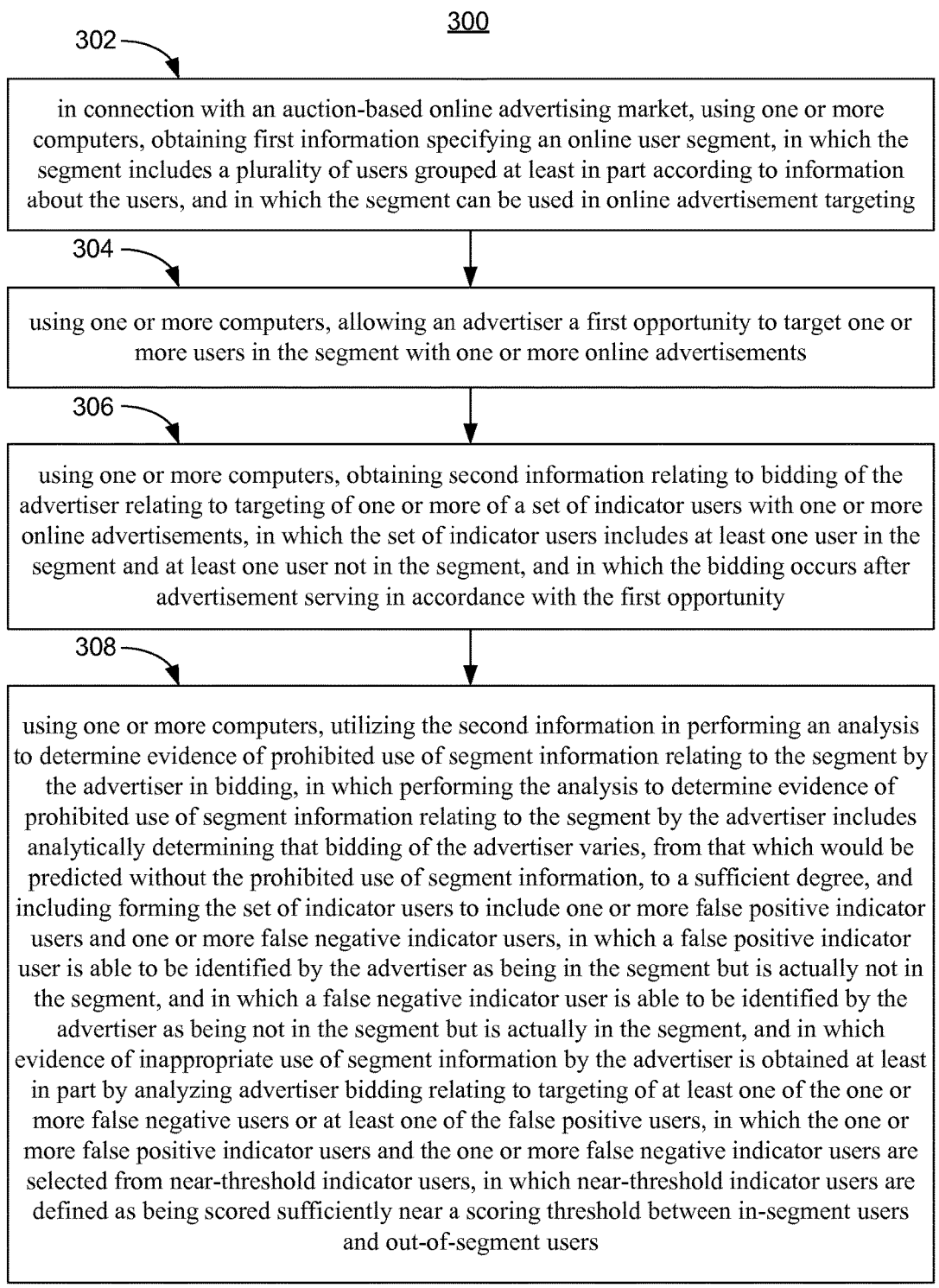
FIG. 3 is a flow diagram illustrating a method according to one embodiment of the invention.

FIG. 3 is a flow diagram illustrating a method 300 according to one embodiment of the invention. Steps 302-306 are similar to steps 202-206 as depicted in FIG. 2.

Step 308 includes, using one or more computers, utilizing the second information in performing an analysis to determine evidence of prohibited use of segment information relating to the segment by the advertiser in bidding. Performing the analysis to determine evidence of prohibited use of segment information relating to the segment by the advertiser includes analytically determining that bidding of the advertiser varies, from that which would be predicted without the prohibited use of segment information, to a sufficient degree.

Step 308 further includes forming the set of indicator users to include one or more false positive indicator users and one or more false negative indicator users. A false positive indicator user is able to be identified by the advertiser as being in the segment but is actually not in the segment, and a false negative indicator user is able to be identified by the advertiser as being not in the segment but is actually. Evidence of inappropriate use of segment information by the advertiser is obtained at least in part by analyzing advertiser bidding relating to targeting of at least one of the one or more false negative users or at least one of the false positive users. The one or more false positive indicator users and the one or more false negative indicator users are selected from near-threshold indicator users, where near-threshold indicator users are defined as being scored sufficiently near a scoring threshold between in-segment users and out-of-segment users. Scoring can relate, for example, to a score provided to each user that may indicate a determined strength with which the user is associated with the segment.

Figure 4:
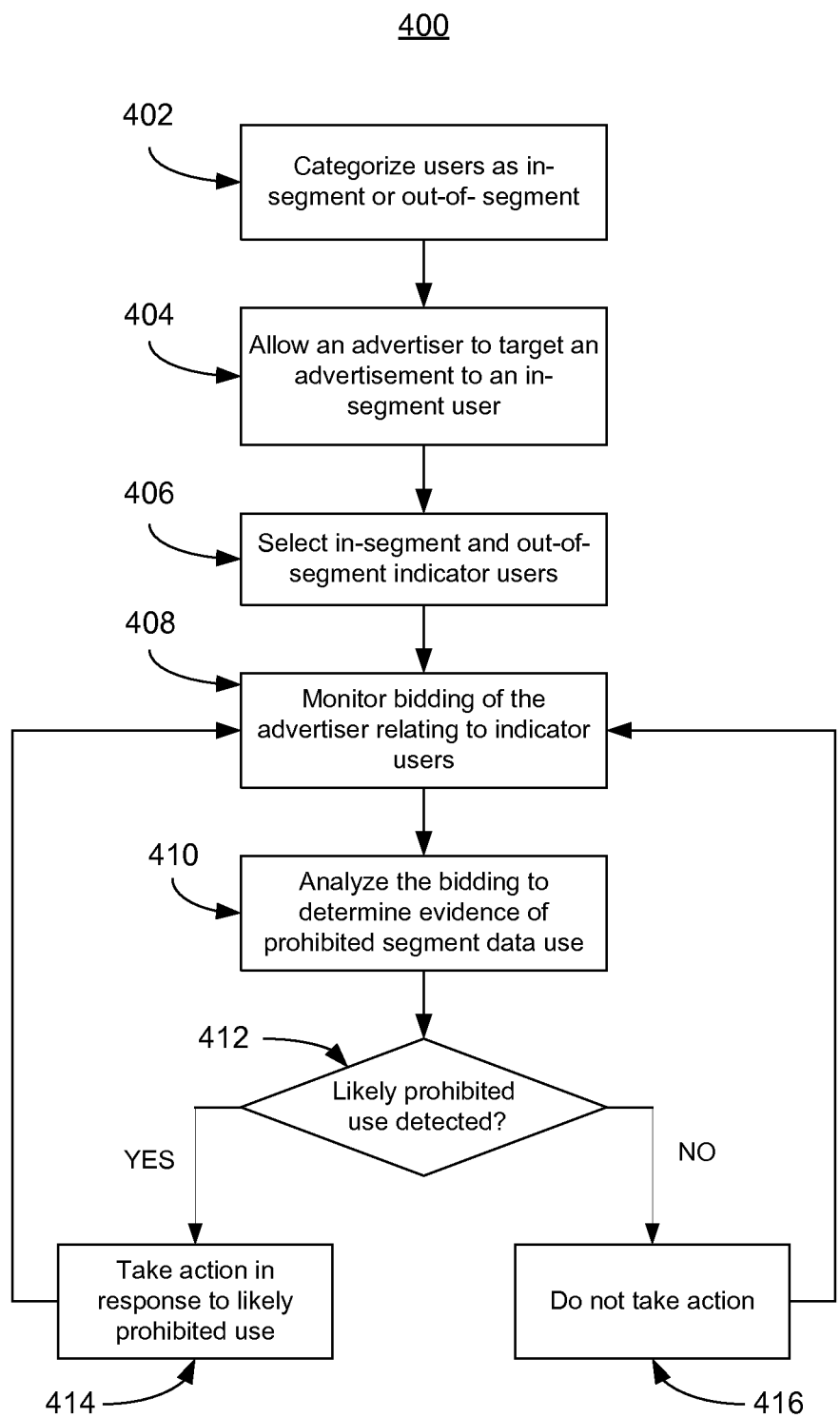
FIG. 4 is a flow diagram illustrating a method according to one embodiment of the invention.

FIG. 4 is a flow diagram 400 illustrating a method according to one embodiment of the invention. Step 402 includes categorization of users as in-segment or out-of-segment.

Step 404 includes allowing an advertiser to target an advertisement to an in-segment user.

Step 406 includes selecting in-segment and out-of-segment indicator users.

Step 408 includes monitoring bidding of the advertiser relating to indicator users.

Step 410 includes analyzing the bidding to determine evidence of prohibited segment data use.

At step 412, the method 400 queries whether likely prohibited data use is detected, which can mean, for example, determined to be above a specified probability threshold. If "yes", then the method 400 proceeds to step 414, where action is taken in response to likely prohibited use. If "no", then the method 400 proceeds to step 416, where no action is taken. Following either step 414 or 416, then method 400 may proceed back to step 408, for continued monitoring, or may end.

Figure 5:
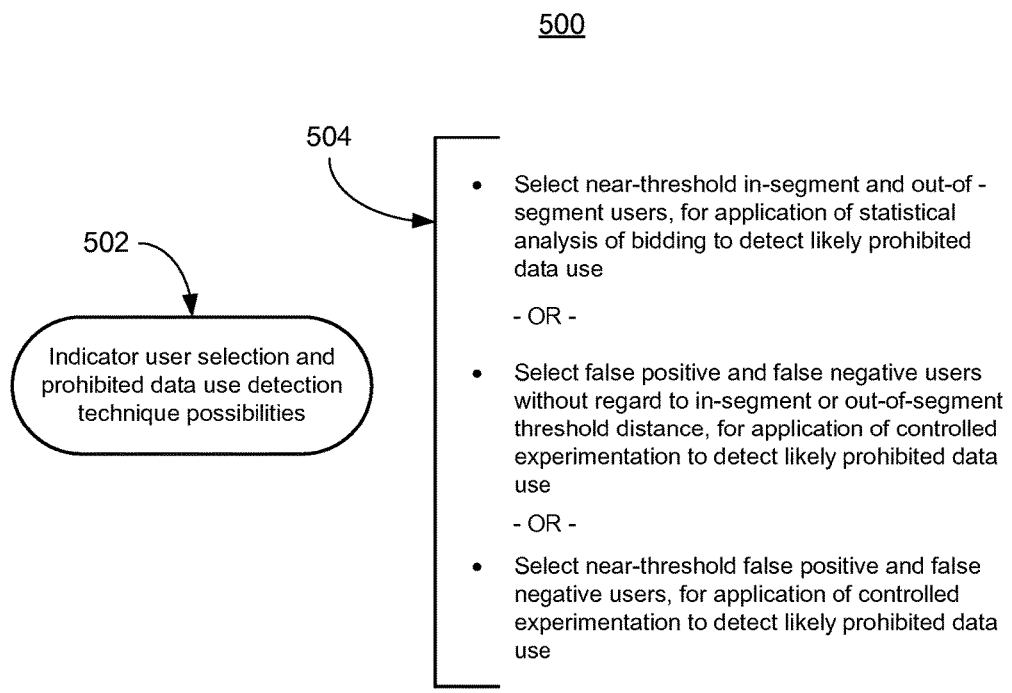
FIG. 5 is a block diagram illustrating one embodiment of the invention.

FIG. 5 is a block diagram 500 illustrating one embodiment of the invention. Block 502 represents indicator user selection and prohibited data use detection technique possibilities, according to various embodiments, while block 504 represents some more specific possibilities or variations, some of which can be used in combination.

In particular, in some embodiments, some embodiments include selecting near-threshold in-segment and out-of-segment users, for application of statistical analysis of bidding to detect likely prohibited data use.

Another possibility, in some embodiments, includes selecting false positive and false negative users without regard to in-segment or out-of-segment threshold distance, for application of controlled experimentation to detect likely prohibited data use.

Still another possibility, in some embodiments, includes Select near-threshold false positive and false negative users, for application of controlled experimentation to detect likely prohibited data use.

Figure 6:
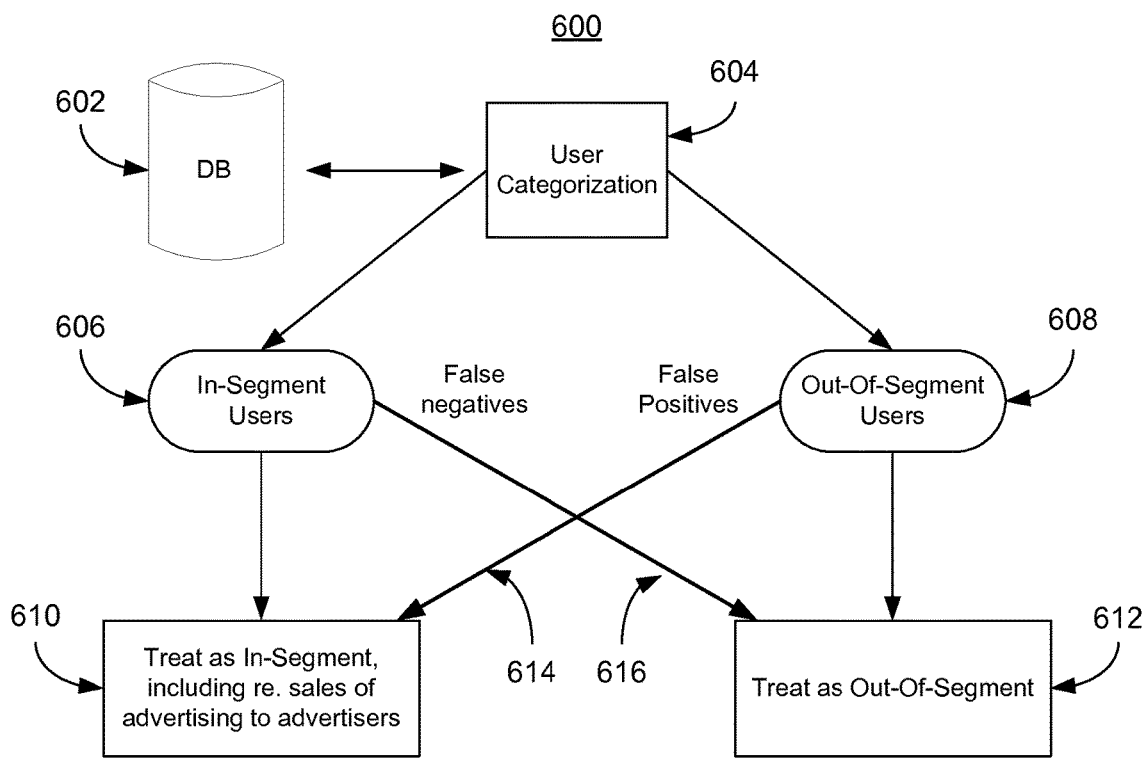
FIG. 6 is a block diagram illustrating one embodiment of the invention.

FIG. 6 is a block diagram 600 illustrating one embodiment of the invention. Block 604 represents categorization of users, which may utilize information from one or more databases 602.

Block 606 represents users categorized as in-segment, while block 608 represents users categorized as out-of-segment.

Block 610 represents treatment of in-segment users as in-segment users, including with regard to sales of advertising to advertisers, such as advertising that is targeted to users in the segment, for example.

Block 612 represents treatment of out-of-segment users as out-of-segment.

However, as lines 614 and 616 indicate, respectively, some in-segment users are utilized as false negative indicator users, and some out-of-segment users are utilized as false positive indicator users. For example, in some embodiments, as described further herein, false negative indicator users and/or false positive users are utilized in controlled experimentation to determine or detect evidence of prohibited data use.

Figure 7:
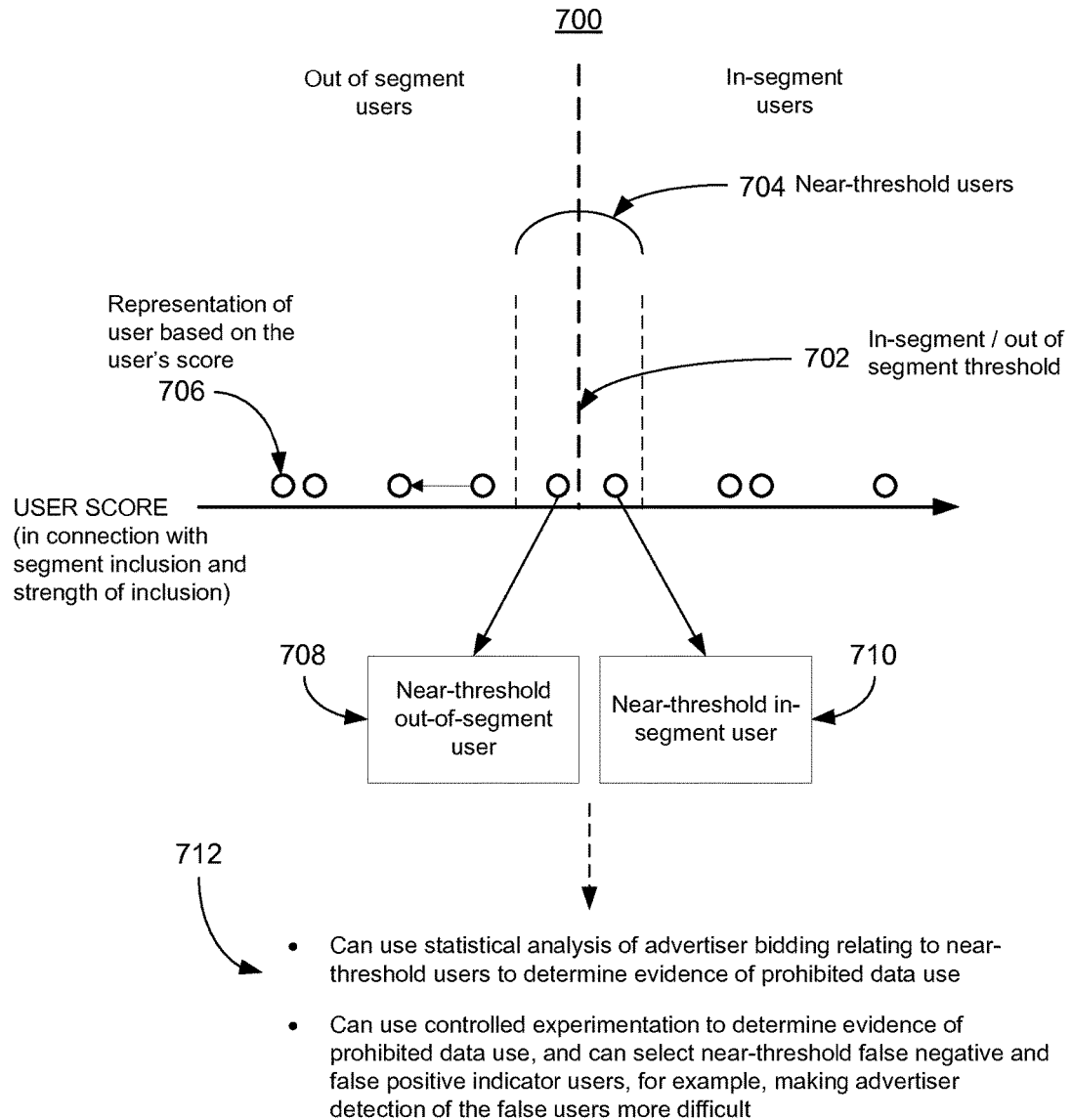
FIG. 7 is a block diagram illustrating one embodiment of the invention.

FIG. 7 is a block diagram 700 illustrating one embodiment of the invention.

Generally, each of many users may be scored with a determined score that may indicate, for example, each user's strength of belonging or adherence to a particular segment. Users below a specified threshold score may be considered out-of-segment, while users with above a specified score may be considered in-segment. Furthermore, users with a score within a certain numerical distance from the threshold may be considered near-threshold. In FIG. 7, broken line 702 represents such a threshold, while the range 704 defines near-threshold users. In some embodiments, for example, segments may include users with certain characteristics that are similar or in common, such as profile, demographics, interests, etc., but many other types of segments are also possible.

Generally, example users are plotted by score and depicted by circles 706. In particular, a near-threshold out-of-segment user is depicted by block 708, and a near-threshold in-segment user is depicted by block 710. Some embodiments of the invention include techniques, such as statistical or experimental techniques, that make use of such users and their information. For example, as depicted by block 712, some embodiments include use of statistical analysis of advertiser bidding relating to near-threshold users to determine evidence of prohibited data use, as described further herein. Furthermore, some embodiments use controlled experimentation to determine evidence of prohibited data use, and can select near-threshold false negative and false positive indicator users, which can, for example, making advertiser detection of the false users more difficult, and thereby enhance the effectiveness or accuracy of the technique or results.

In some embodiments of the invention, techniques are provide that may be utilized by or for entities such as, for example, online advertising market-makers, market facilitators, data providers, or publishers, or others. For example, Internet publishers may collect information on their users, including asking for demographic information and recording which content users select, etc. Publishers, for example, may use this information in categorizing users into segments. The segments are may be made available or useful to advertisers for targeting their ads. Such targeting may fetch higher advertiser pricing or premiums. Publishers may, for example, charge advertisers more to target segments than to buy with more general targeting or to buy using the advertiser's own targeting.

When an advertiser places an online advertisement, the advertiser may, for example, deliver a pixel on the ad that places a cookie in the user's browser. By doing this, an advertiser may cookie some or all of the users in the publisher segment. Later, the advertiser may use those cookies to determine that users are in the publisher segment even when the advertiser is no longer paying to target the segment. Specifically, an advertiser may participate in real-time bidding, checking ad calls for its cookies that indicate a user is in the publisher segment and bidding extra for those ad calls. Of course, this is just one of many possible scenarios of such information gathering and usage.

As part of the terms of use, a publisher may, for example, require that advertisers not use (which can include re-use) the publisher segment information for later targeting. Advertisers may agree not to re-use publisher segments, but may still do so. Other advertisers may follow the agreement while obtaining segment information from some other source to use for real-time bidding. These other segments may have many of the same users as the publisher segments. As a result, both complying and non-complying advertisers may bid extra for users in the publisher segment. So, for publishers to detect data re-use, they may need or wish to utilize a method to indicate whether real time bids are driven by publisher segments or by other information.

Some embodiments of the invention include detecting indications of data re-use by checking whether ad calls from some indicator users draw bids consistent with data re-use. The term "indicator user" is used herein in a broad sense, and can mean or include users specified for use in experimentation, statistical analysis, or other analysis, for example. In some embodiments, some indicator users are users added to a publisher segment even though, according to publisher data, they do not belong in the segment. These indicator users are examples of false positive users. For example, if advertisers place similar average bids for ad calls from these false positive users as for ad calls from other users in the publisher segment (which may be more than for out-of-segment users), then data re-use (such as prohibited data use) may be evidenced or indicated. Generally, without data re-use, bids for false positive user ad calls may be predicted or expected to be statistically similar to bids for ad calls from the general population, and not to the "true positive" users in the publisher's segment.

Similarly, in some embodiments, a publisher may withhold some users from a publisher segment even though, according to publisher data, they belong in the segment. The withheld users may be examples of false negative users. Without data re-use, bids for ad calls from false negative users may be predicted or expected to be statistically similar to bids for ad calls from the true positive users in the publisher segment. So advertisers bidding statistically significantly more on average for the "true positive" users in the segment than for the withheld false negative users may indicate or evidence data re-use.

Another embodiment applies in the common case where the publisher uses its data to generate a score, such as a "membership score", for each user in relation to a segment. Then publisher may then include in the segment all users with scores above some threshold. In some embodiments, near-negative users may be near-threshold users those whose scores barely qualify them for segment membership, and near-positive users may be near-threshold users whose scores almost qualify them for segment membership. In some embodiments, data re-use may be evidenced or indicated if, for example, near-negative user ad calls draw statistically significantly higher average bids than near-positive user ad calls.

In some embodiments, using near-negative and near-positive sets of users, a publisher can test for data re-use by, for example, applying regression to estimate the influence of scores and the influence of segment membership on advertiser bids. Data re-use (which can, in some embodiments, include likely data re-use or sufficiently likely data re-use) may be indicated if segment membership makes a statistically significant contribution to bids even after accounting for membership scores. It may be necessary to account for membership scores because, in general, higher membership scores are likely to indicate a higher probability of the advertiser identifying the user through legitimate means.

In some embodiments, in what can be in some ways thought of as a hybrid, or combination or partial combination of some elements of, previous embodiments, publishers select false negative users from among the near-negative users and withhold them from the segment as provided to or used for the advertiser, and also select false positive users from among the near-positive users and add them to the segment as provided to or used for the advertiser. Then, statistically significantly higher bids for the false positive users' ad calls than for the false negative users' ad calls may evidence or indicate data re-use.

In some embodiments, the foregoing approach may be more subtle than the first embodiment while retaining the simplicity of using a statistical test rather than a regression. It may be more subtle, for example, because it uses borderline users as its indicator users, making it more difficult for advertisers to identify false positive and false negative users based on outside data sources. In some embodiments, it can use a statistical test because it need not account for differences in scores, since it treats some lower-scoring users as higher-scoring ones and vice versa, making it a controlled test for whether membership in the segment affects later bids for users' ad calls.

In some embodiments, for example, false positive and false negative users may be sampled at random, so that the embodiments that use them are randomized controlled tests for an effect of segment membership on later bids for users' ad calls. For example, there are several standard statistical methods to give levels of confidence about effects in randomized trials. These include, for example, the t-test, examining differences between sample means in terms of standard deviations of the estimates of the means, and applying concentration results to bound differences between empirical and actual means (concentration results include Hoeffding bounds and empirical Bernstein bounds, for example). In practice, the t-test is often applied, but the concentration bounds have the advantage of not depending on normality.

For example, for the regression approach, there are well-known methods to determine confidence intervals for regression coefficients. There are also well-known methods (referred to as ANOVA—analysis of variance methods) that can be applied to estimate how much of the variation in bids can be "explained" by scores and how much is "explained" by segment membership.

In some embodiments, techniques are utilized given a recognition that multiple publishers may work together to detect data re-use. For example, in some scenarios, an advertiser may undermine the method by bidding extra only for users found in multiple publishers' segments. To avoid this, multiple publishers may, for example, use the same indicator users. If the publishers want to determine which publishers' data is being re-used, they may assign some users as indicators for some subsets of publishers but not others, creating the equivalent of an experiment based on a combinatorial design.

It is noted that, herein, an "advertiser" can include, for example, an advertiser or an advertiser(s) representative or proxy, such as an agency a network or a DSP (demand side platform), among other things.

It is further noted that, herein, a "publisher" can include, for example, a publisher or a publisher(s) representative, such as a network or an SSP (supply side platform).

Herein, "targeting" may include, among other things, planning or arranging for advertisement serving, such as, for example, in connection with a serving opportunity to a user.

It is further noted that, herein "data re-use" can include, for example, any prohibited data use. Furthermore, data re-use can involve multiple entities. For example, some types of data re-use may involve other than a single advertiser buying a segment and then re-using it. For example, instead, one advertiser may buy the segment, collect the segment through cookies, then sell it to another advertiser. Alternatively, the collected segment could be sold to a series of buyers and then to an advertiser who uses it, and some buyers in the series may aggregate the segment with other segments before re-selling.

It is further noted that data re-use can occur in real time bidding contexts as well as other contexts. For example, an advertiser can form its own segment of users and target such users in an exchange. In these cases, in some embodiments, for example, the same or similar techniques or analyses may be utilized, but may be applied to the set of users in (and bids for) advertisers' custom segments in place of their bids and users for real-time bidding.

Furthermore, it is noted that any of various entities, alone or together, may utilize techniques according to embodiments of the invention, including, among others, publishers, market-makers, market facilitators, market participants, an advertising exchange, Web sites or related entities, Web portals or related entities, an advertising market, any of various other parties, representatives or agents of parties or entities, etc.

In some embodiments, action may be taken if prohibited data use is determined, or is determined to be sufficiently likely. Such actions may vary, and may include, for example, among other: notification, charges or penalties on advertisers, steps to enforce, more effectively enforce, stop or deter further prohibited data use; legal action or threatened legal action; steps taken against the interest of such advertisers; steps that may be taken if prohibited data use continues, etc. Furthermore, if prohibited data use is detected, more frequent or intense monitoring may be put in place for further proof, or proof of other examples of prohibited data use or other conduct, etc.

Some embodiments of the invention, by providing techniques for detection of prohibited data use, for example, enable entities, such as publishers or others, to enjoy and protect the value of its data about its users. Furthermore, if such entities may be engaged in direct or indirect selling of such data, in some embodiments, techniques are provided that may help sustain the continued profitability or business viability of such entities, by, for example, preventing unauthorized use, taking or stealing of the valuable data.

While the invention is described with reference to the above drawings, the drawings are intended to be illustrative, and the invention contemplates other embodiments within the spirit of the invention.

The invention claimed is:

1. In connection with an auction-based online advertising market, a method comprising:
    using one or more computers, obtaining first information specifying an online user segment, wherein the segment comprises a plurality of users grouped at least in part according to information about the users, and wherein the segment is used in online advertisement targeting;
    using one or more computers, providing an advertiser a first opportunity to target one or more users in the segment with one or more online advertisements;
    using one or more computers, obtaining second information relating to bidding of the advertiser relating to targeting of one or more of a set of indicator users with one or more online advertisements, wherein the set of indicator users includes at least one user in the segment and at least one user not in the segment, and wherein the bidding occurs after advertisement serving in accordance with the first opportunity; and
    using one or more computers, utilizing the second information in performing an analysis to determine evidence of prohibited use of segment information relating to the segment by the advertiser in bidding, the prohibited use of segment information comprising delivering, by the advertiser via the one or more server computers coupled to a network, a cookie via the one or more online advertisements to the one or more users in the segment, performing the analysis comprising utilizing a statistical technique comprising selecting near-threshold indicator users, the selecting the near-threshold indicator users comprising forming the set of indicator users to include a randomly selected subset of one or more false positive indicator users and a randomly selected subset of one or more false negative indicator users, wherein a false positive indicator user is identified by the advertiser as being in the segment but is actually not in the segment, and wherein a false negative indicator user is identified by the advertiser as not being in the segment but is actually in the segment, and wherein evidence of inappropriate use of segment information by the advertiser is obtained at least in part by analyzing advertiser bidding relating to targeting of at least one user of the randomly selected subset of one or more false negative users or at least one user of the randomly selected subset of one or more false positive users, the near-threshold indicator users defined as being scored near a scoring threshold between in-segment users and out-of-segment users, and analyzing advertiser bidding relating to near-threshold users in determining evidence of inappropriate use of segment information by the advertiser.

2. The method of claim 1, comprising, if determined evidence indicates a probability of prohibited segment information use above a threshold level, then taking action consistent with a conclusion that prohibited segment information use has occurred or consistent with the conclusion that prohibited segment information use has likely occurred.

3. The method of claim 1, wherein performing an analysis to determine evidence of prohibited use of segment information relating to the segment by the advertiser further comprises analytically determining that bidding of the advertiser varies, from that which would be predicted without the prohibited use of segment information, to a determined degree.

4. The method of claim 1, wherein performing an analysis further comprises forming the set of indicator users to include one or more false positive indicator users and one or more false negative indicator users, wherein a false positive indicator user is identified by the advertiser as being in the segment but is actually not in the segment, and wherein a false negative indicator user is identified by the advertiser as being not in the segment but is actually in the segment, and wherein evidence of inappropriate use of segment information by the advertiser is obtained at least in part by analyzing advertiser bidding relating to targeting of at least one of the one or more false negative users or at least one of the one or more false positive users.

5. The method of claim 1, wherein performing an analysis further comprises:
forming the set of indicator users to include one or more false positive indicator users and one or more false negative indicator users, wherein a false positive indicator user is identified by the advertiser as being in the segment but is actually not in the segment, and wherein a false negative indicator user is identified by the advertiser as being not in the segment but is actually in the segment, and wherein evidence of inappropriate use of segment information by the advertiser is obtained at least in part by analyzing advertiser bidding relating to targeting of at least one of the one or more false negative users or at least one of the false positive users, wherein the one or more false positive indicator users and the one or more false negative indicator users are selected from near-threshold indicator users, wherein near-threshold indicator users are defined as being scored near a scoring threshold between in-segment users and out-of-segment users.

6. The method of claim 1, comprising utilizing the second information in performing an analysis to determine evidence of prohibited use of segment information relating to the segment by the advertiser in determining bid amounts, and wherein prohibited use includes use in violation of an agreement or contract relating to online advertising.

7. The method of claim 1, comprising performing the analysis, wherein the analysis includes utilizing at least one experiment or statistical technique.

8. The method of claim 1, comprising performing the method in a real time, or near real time, spot market online advertising auction.

9. The method of claim 1, wherein providing an advertiser a first opportunity comprises a market facilitator entity or a publisher at least in part providing the first opportunity.

10. The method of claim 1, comprising providing the advertiser the first opportunity utilizing an advertising exchange.

11. The method of claim 1, wherein performing the analysis further comprises utilizing randomized, controlled experimentation in relation to analyzing advertiser bids on advertisement calls.

12. The method of claim 1, wherein performing the analysis further comprises utilizing randomized, controlled experimentation and using at least one t-test in relation to analyzing advertiser bids on advertisement calls.

13. The method of claim 1, wherein performing the analysis further comprises utilizing randomized, controlled experimentation and using concentration results including Hoeffding bounds or empirical Bernstein bounds.

14. A system, for use in connection with an auction-based online advertising market, comprising:
one or more server computers coupled to a network; and
one or more databases coupled to the one or more server computers;
wherein the one or more server computers are for:
obtaining first information specifying an online user segment, wherein the segment comprises a plurality of users grouped at least in part according to information about the users, and wherein the segment is used in online advertisement targeting;
providing an advertiser a first opportunity to target one or more users in the segment with one or more online advertisements;
obtaining second information relating to bidding of the advertiser relating to targeting of one or more of a set of indicator users with one or more online advertisements, wherein the set of indicator users includes at least one user in the segment and at least one user not in the segment, and wherein the bidding occurs after advertisement serving in accordance with the first opportunity; and
utilizing the second information in performing an analysis to determine evidence of prohibited use of segment information relating to the segment by the advertiser in bidding, the prohibited use of segment information comprising delivering, by the advertiser via the one or more server computers coupled to a network, a cookie via the one or more online advertisements to the one or more users in the segment, performing the analysis comprising utilizing a statistical technique comprising selecting near-threshold indicator users, the selecting the near-threshold indicator users comprising forming the set of indicator users to include a randomly selected subset of one or more false positive indicator users and a randomly selected subset of one or more false negative indicator users, wherein a false positive indicator user is identified by the advertiser as being in the segment but is actually not in the segment, and wherein a false negative indicator user is identified by the advertiser as not being in the segment but is actually in the segment, and wherein evidence of inappropriate use of segment information by the advertiser is obtained at least in part by analyzing advertiser bidding relating to targeting of at least one user of the randomly selected subset of one or more false negative users or at least one user of the randomly selected subset of one or more false positive users, near-threshold indicator users defined as being scored near a scoring threshold between in-segment users and out-of-segment users, and analyzing advertiser bidding relating to near-threshold users in determining evidence of inappropriate use of segment information by the advertiser.

15. The system of claim 14, wherein performing the analysis to determine evidence of prohibited use of segment information relating to the segment by the advertiser further comprises analytically determining that bidding of the advertiser varies, from that which would be predicted without the prohibited use of segment information, to a determined degree.

16. The system of claim 14, wherein performing the analysis further comprises forming the set of indicator users to include one or more false positive indicator users and one or more false negative indicator users, wherein a false positive indicator user is able to be identified by the advertiser as being in the segment but is actually not in the segment, and wherein a false negative indicator user is able to be identified by the advertiser as being not in the segment but is actually in the segment, and wherein evidence of inappropriate use of segment information by the advertiser is obtained at least in part by analyzing advertiser bidding relating to targeting of at least one of the one or more false negative users or at least one of the one or more false positive users.

17. The system of claim 14, wherein performing the analysis further comprises:
forming the set of indicator users to include one or more false positive indicator users and one or more false negative indicator users, wherein a false positive indicator user is able to be identified by the advertiser as being in the segment but is actually not in the segment, and wherein a false negative indicator user is able to be identified by the advertiser as being not in the segment but is actually in the segment, and wherein evidence of inappropriate use of segment information by the advertiser is obtained at least in part by analyzing advertiser bidding relating to targeting of at least one of the one or more false negative users or at least one of the false positive users, wherein the one or more false positive indicator users and the one or more false negative indicator users are selected from near-threshold indicator users, wherein near-threshold indicator users are defined as being scored near a scoring threshold between in-segment users and out-of-segment users.

18. A non-transitory computer readable medium or media containing instructions for executing, in connection with an auction-based online advertising market, a method comprising:
using one or more computers, obtaining first information specifying an online user segment, wherein the segment comprises a plurality of users grouped at least in part according to information about the users, and wherein the segment is used in online advertisement targeting;
using one or more computers, providing an advertiser a first opportunity to target one or more users in the segment with one or more online advertisements;
using one or more computers, obtaining second information relating to bidding of the advertiser relating to targeting of one or more of a set of indicator users with one or more online advertisements, wherein the set of indicator users includes at least one user in the segment and at least one user not in the segment, and wherein the bidding occurs after advertisement serving in accordance with the first opportunity; and
using one or more computers, utilizing the second information in performing an analysis to determine evidence of prohibited use of segment information relating to the segment by the advertiser in bidding, the prohibited use of segment information comprising delivering, by the advertiser via the one or more server computers coupled to a network, a cookie via the one or more online advertisements to the one or more users in the segment,
wherein performing the analysis to determine evidence of prohibited use of segment information relating to the segment by the advertiser comprises analytically determining that bidding of the advertiser varies, from that which would be predicted without the prohibited use of segment information, to a predetermined degree,
and comprising forming the set of indicator users to include one or more false positive indicator users and one or more false negative indicator users, wherein a false positive indicator user is able to be identified by the advertiser as being in the segment but is actually not in the segment, and wherein a false negative indicator user is able to be identified by the advertiser as being not in the segment but is actually in the segment, and wherein evidence of inappropriate use of segment information by the advertiser is obtained at least in part by analyzing advertiser bidding relating to targeting of at least one of the one or more false negative users or at least one of the false positive users, wherein the one or more false positive indicator users and the one or more false negative indicator users are selected from near-threshold indicator users, wherein near-threshold indicator users are defined as being scored near a scoring threshold between in-segment users and out-of-segment users, performing the analysis comprising utilizing a statistical technique comprising selecting near-threshold indicator users, the selecting the near-threshold indicator users comprising forming the set of indicator users to include a randomly selected subset of one or more false positive indicator users and a randomly selected subset of one or more false negative indicator users, wherein a false positive indicator user is identified by the advertiser as being in the segment but is actually not in the segment, and wherein a false negative indicator user is identified by the advertiser as not being in the segment but is actually in the segment, and wherein evidence of inappropriate use of segment information by the advertiser is obtained at least in part by analyzing advertiser bidding relating to targeting of at least one user of the randomly selected subset of one or more false negative users or at least one user of the randomly selected subset of one or more false positive users, near-threshold indicator users defined as being scored near a scoring threshold between in-segment users and out-of-segment users, and analyzing advertiser bidding relating to near-threshold users in determining evidence of inappropriate use of segment information by the advertiser.

\* \* \* \* \*